US006403230B1

(12) United States Patent
Keener

(10) Patent No.: US 6,403,230 B1
(45) Date of Patent: Jun. 11, 2002

(54) METHOD FOR PREPARING PRE-COATED ALUMINUM ALLOY ARTICLES AND ARTICLES PREPARED THEREBY

(75) Inventor: Steven G. Keener, Trabuco Canyon, CA (US)

(73) Assignee: McDonnell Douglas Corporation, Long Beach, CA (US)

( * ) Notice: Subject to any disclaimer, the term of this patent is extended or adjusted under 35 U.S.C. 154(b) by 0 days.

(21) Appl. No.: 09/570,651

(22) Filed: May 15, 2000

Related U.S. Application Data

(60) Division of application No. 09/305,500, filed on May 5, 1999, now Pat. No. 6,221,177, which is a division of application No. 09/005,743, filed on Jan. 12, 1998, now Pat. No. 5,922,472, which is a division of application No. 08/634,748, filed on Apr. 26, 1996, now Pat. No. 5,858,133, which is a continuation-in-part of application No. 08/432,223, filed on May 1, 1995, now Pat. No. 5,614,037.

(51) Int. Cl.[7] .................. B32B 15/08

(52) U.S. Cl. .................. 428/460; 148/537; 148/698

(58) Field of Search .................. 428/460; 148/537, 148/697, 698

(56) References Cited

U.S. PATENT DOCUMENTS

| | | | |
|---|---|---|---|
| 2,092,034 | A | 9/1937 | Stroup |
| 3,032,448 | A | 5/1962 | Siebel et al. |
| 3,065,108 | A | 11/1962 | Seelig et al. |
| 3,123,516 | A | 3/1964 | Eiland |
| 3,704,176 | A | 11/1972 | Oga et al. |
| 3,799,848 | A | 3/1974 | Kolic et al. |
| 3,841,896 | A | 10/1974 | Boggs et al. |
| 3,899,370 | A | 8/1975 | Takahashi et al. |
| 3,945,899 | A | 3/1976 | Nikaido et al. |

(List continued on next page.)

FOREIGN PATENT DOCUMENTS

| | | |
|---|---|---|
| EP | 06 028 19 | 6/1994 |
| EP | 06 160 44 | 9/1994 |
| GB | 1322381 | 7/1973 |
| JP | 51-039541 | 4/1976 |
| JP | 56-155750 | 12/1981 |
| JP | 63-143290 | 6/1988 |

OTHER PUBLICATIONS

SN 174,078, Durr, Alien Property Custodian Report, May 11, 1943.

Material Safety Data Sheet for Hi–Kote 1, Anon, 2 pages (Feb. 9, 1994).

Material Safety Data Sheet for Alumazite ZY–138, Anon, 4 pages (Apr. 27, 1993).

*Primary Examiner*—George Wyszomierski
(74) *Attorney, Agent, or Firm*—Alston & Bird LLP

(57) ABSTRACT

An aluminum-alloy article such as a fastener is prepared by providing an aluminum-alloy article precursor that is not in its final heat-treated state, and in one form is in its solution treated/annealed state. A curable organic coating material is also provided. The method includes anodizing the article precursor, preferably in chromic acid solution and without chemical sealing during anodizing, applying the organic coating material to the aluminum-alloy article precursor, and precipitation heat-treating the coated aluminum article precursor to its final heat-treated state, thereby simultaneously curing the organic coating. If the aluminum alloy temper is of the naturally aging type, it is optionally lightly deformed prior to precipitation treatment aging. The approach may also be applied to articles that are not solution treated/annealed and aged, by first overly deforming the article precursor so that the curing treatment of the coating also partially anneals the article precursor to the final desired deformation state.

6 Claims, 5 Drawing Sheets

U.S. PATENT DOCUMENTS 3,979,351 A 9/1976 Sekhon
3,983,304 A 9/1976 Sekhon
4,115,607 A 9/1978 Hasegawa et al.
4,238,379 A * 12/1980 Reinhart ..................... 428/460
4,642,011 A 2/1987 Uramoto et al.
4,910,086 A * 3/1990 Kawakami et al. ......... 428/460
5,077,096 A 12/1991 Sharaby
5,104,514 A 4/1992 Quartarone
5,330,635 A 7/1994 Floyd, Jr.
5,614,037 A 3/1997 Keener
5,624,712 A 4/1997 Shulman
5,680,690 A * 10/1997 Briles et al. .................. 29/458
5,858,133 A 1/1999 Keener
5,922,472 A 7/1999 Keener
5,944,918 A 8/1999 Keener
6,150,032 A * 11/2000 Yang et al. ................. 428/460

* cited by examiner

METHOD FOR PREPARING PRE-COATED ALUMINUM ALLOY ARTICLES AND ARTICLES PREPARED THEREBY

This application is a divisional of U.S. Ser. No. 09/305,500, filed May 5, 1999 now U.S. Pat. No. 6,221,177, which is a divisional of U.S. Ser. No. 09/005,743 filed Jan. 12, 1998, issued Jul. 13, 1999, as U.S. Pat. No. 5,922,472, which is a divisional of U.S. Ser. No. 08/634,748 filed Apr. 26, 1996, issued Jan. 12, 1999, as U.S. Pat. No. 5,858,133, which is a continuation-in-part of U.S. Ser. No. 08/432,223 filed May 1, 1995, issued Mar. 25, 1997 as U.S. Pat. No. 5,614,037, for which priority is claimed.

BACKGROUND OF THE INVENTION

This invention relates to the preparation of coated aluminum-alloy articles, and, more particularly, to the preparation of coated aluminum rivets.

Fasteners are used to mechanically join the various structural elements and subassemblies of aircraft. For example, a large transport aircraft typically includes over one million fasteners such as bolts, screws, and rivets. The fasteners are formed of strong alloys such as titanium alloys, steel, and aluminum alloys. In some cases, the fasteners are heat-treated, as by a precipitation-hardening aging treatment, to achieve as high a strength, in combination with other desirable properties, as is reasonably possible for that particular alloy. Heat-treating usually involves a sequence of one or more steps of controlled heating in a controlled atmosphere, maintenance at temperature for a period of time, and controlled cooling. These steps are selected for each particular material in order to achieve its desired physical and mechanical properties. In other cases, the fastener is used in an as-worked condition.

It has been the practice to coat some types of fasteners with organic coatings to protect the base metal of the fasteners against corrosion damage. In the usual approach, the fastener is first fabricated and then heat-treated to its required strength. After heat-treatment, the fastener is etched with a caustic soda bath to remove the scale produced in the heat-treatment. Optionally, the fastener is alodined or anodized. The coating material, dissolved in a volatile carrier liquid, is applied to the fastener by spraying, dipping, or the like. The carrier liquid is evaporated. The coated fastener is heated to elevated temperature for a period of time to cure the coating. The finished fastener is used in the fabrication of the structure.

This coating approach works well with fasteners made of a base metal having a high melting point, such as fasteners made of steel or titanium alloys. Such fasteners are heat-treated at temperatures well above the curing temperature of the coating. Consequently, the curing of the coating, conducted after heat-treating of the fastener is complete, does not adversely affect the properties of the already-treated base metal.

On the other hand, aluminum alloys have a much lower melting point, and thence a generally much lower heat-treatment temperature, than steel and titanium alloys. It has not been the practice to coat high-strength aluminum-alloy fasteners with curable coatings, because it is observed that the curing treatment for the coating can adversely affect the strength of the fastener. The aluminum-alloy fasteners are therefore more susceptible to corrosion than would otherwise be the case. Additionally, the presence of the organic coating aids in the installation of the fastener for titanium alloys and steel. The absence of the coating means that aluminum fasteners such as rivets must be installed using a wet sealant compound for purposes of corrosion protection. The wet sealant compound typically contains toxic components and therefore requires precautions for the protection of the personnel using it and for environmental protection. It is also messy and difficult to work with, and may require extensive cleanup of the area around the fastener using caustic chemical solutions.

There exists a need for an improved approach to the protection of aluminum-based fasteners such as rivets. The present invention fulfills this need, and further provides related advantages.

SUMMARY OF THE INVENTION

The present invention provides a method for preparing an aluminum-alloy article such as a fastener, and more specifically a rivet. For a heat-treatable article, the article is heat-treated to have good mechanical properties and also is protected by a cured organic coating. For a cold-worked article, the coating is applied and cured while still achieving the desired deformation state in the article. The application of the coating does not adversely affect the desired final properties of the article. The present approach is accomplished at an additional cost of much less than one cent per fastener above its unprotected cost.

In accordance with the invention, a method for preparing an aluminum-alloy article comprises the steps of providing an aluminum-alloy article precursor that is not in its final heat-treated state, and anodizing the article precursor, preferably in chromic acid solution and also preferably without sealing the surface of the article precursor in the anodizing step. The method further includes providing a curable organic coating material, the coating material having a non-volatile portion that is predominantly organic and is curable at about a heat-treatment temperature of the aluminum-alloy article precursor, and applying the organic coating material to the aluminum-alloy article precursor. The coated aluminum article precursor is heat treated to its final heat-treated state at the heat-treatment temperature and for a time sufficient to complete the heat treatment of the aluminum alloy precursor and to cure the organic coating, forming the article.

In one embodiment of the present approach, the article precursor and thence the article is made of an aluminum alloy having a temper achieved by artificial aging to its final state. This article precursor is provided in a solution treated/annealed condition suitable for the subsequent utilization of the strengthening heat-treatment, but not as yet final heat-treated. The article precursor is anodized, preferably in chromic acid solution, to improve the adhesion of the subsequently applied coating to the article precursor, and also preferably without sealing the surface of the article precursor. The organic coating material, preferably dissolved in a suitable carrier liquid, is applied to the anodized surface of the article which is not in its final heat-treated state. The carrier liquid is removed by evaporation. The heat treatment of the article precursor is thereafter completed to bring the article to its full strength by heating to elevated temperature in a precipitation-hardening aging treatment. During the precipitation-hardening aging treatment according to the combination of temperature(s), time(s), and environment(s) specified for the aluminum-alloy base metal of the fastener, the coating is cured. Thus, no separate curing procedure is required after coating an already heat-treated article, which curing procedure would be likely to adversely affect the strength of the base metal of the article.

In another embodiment, the article is made of an aluminum alloy having a temper that is achieved by natural aging. (The distinction between artificial and natural aging is that during precipitation treatment artificial aging involves heating the article to elevated temperature, and natural aging is accomplished at room temperature.) In this case, the article is deformed prior to coating with the organic coating material and naturally aged. It is coated and heated to accomplish curing of the coating and some artificial aging. Absent the additional deformation during fabrication and prior to curing of the coating, the article is found to overage when heated to cure the coating.

In yet another embodiment, the article is not normally heat treated, but instead is used in a final deformation state that imparts significant cold work to its structure, either before or during fabrication. In this case, the article precursor is over-deformed to a deformation state greater than that required in the final article, optionally anodized in chromic acid solution, coated with the organic coating material, and then heated to cure the coating and partially anneal the article precursor to the required deformation state.

All of these embodiments yield surprising and unexpected technical and cost advantages when used in conjunction with high-strength aluminum fasteners such as rivets. The aluminum-alloy fasteners exhibit their full required strength produced by the heat-treatment used by itself or the required deformation state. The achieving of a specified strength level is important, because users of the rivets, such as the customers of aircraft, will not permit a sacrifice of mechanical performance to achieve improved corrosion resistance. Instead, in the past they have required both acceptable mechanical performance and also the use of wet sealants to achieve acceptable corrosion resistance. In the present approach, on the other hand, the article has both acceptable mechanical performance and a coating for acceptable corrosion protection. Therefore, during installation of a fastener made by the present approach, wet sealants need not be applied to the fastener and faying surfaces of the hole into which the fastener is inserted just before upsetting the fastener.

The elimination of the requirement for the wet sealant installation approach for the over-700,000 rivets in a large cargo aircraft offers a cost savings of several million dollars per aircraft. The elimination of the use of wet sealants also improves the workmanship in the fastener installation, as there is no possibility of missing some of the fasteners as the wet sealant is applied. The coated fasteners are more resistant to corrosion during service than are uncoated fasteners.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
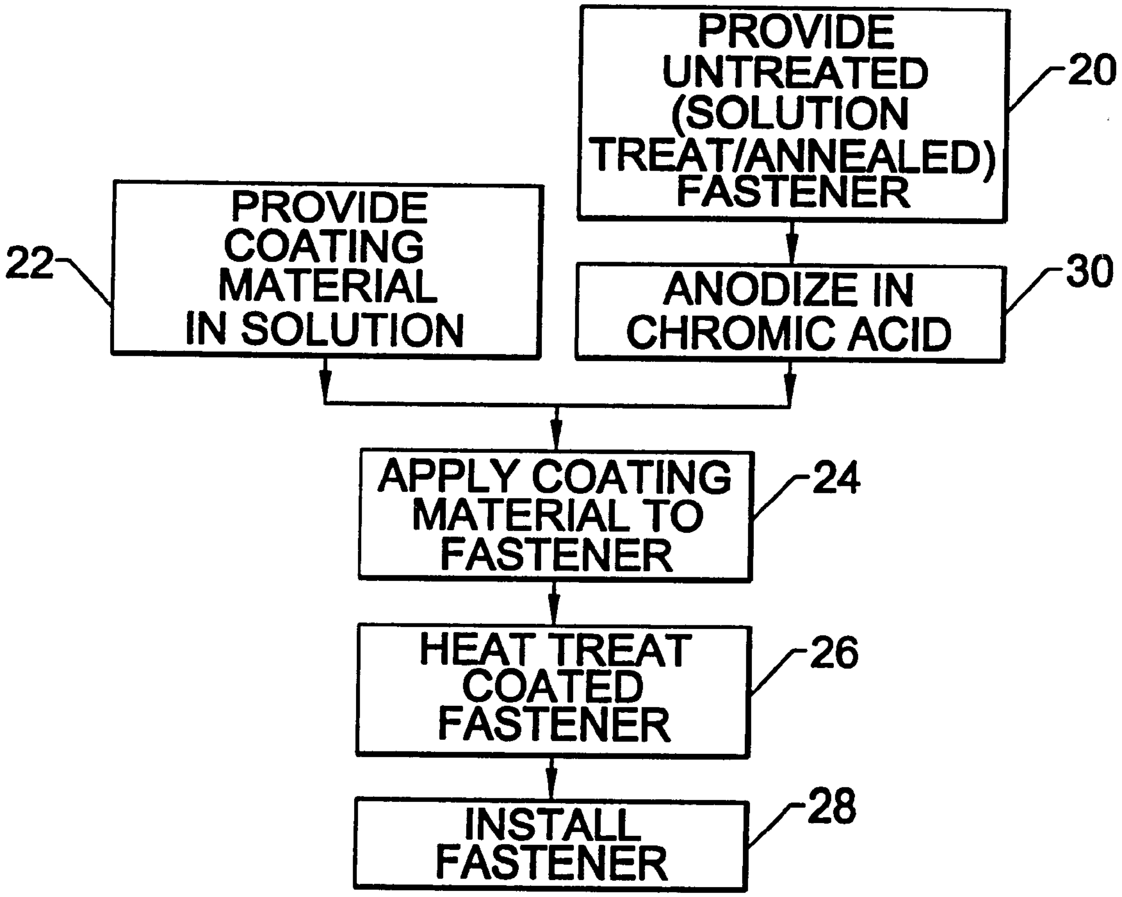
FIG. 1 is a process flow diagram for a first embodiment of the method of the invention.

As depicted in FIG. 1, an untreated (i.e., uncoated and annealed) article is first provided. The preferred embodiment of the invention relates to the preparation of fasteners such as rivets, and the following discussion will emphasize such articles. The use of the invention is not limited to fasteners and rivets, and instead is more broadly applicable. However, its use in fasteners offers particular advantages that will be discussed.

Figure 4:
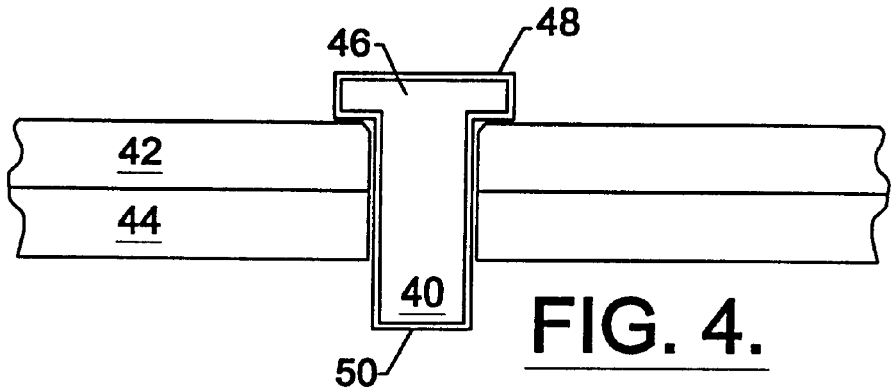
FIG. 4 is a schematic sectional view of a protruding-head rivet fastener used to join two pieces, prior to upsetting.
Figure 5:
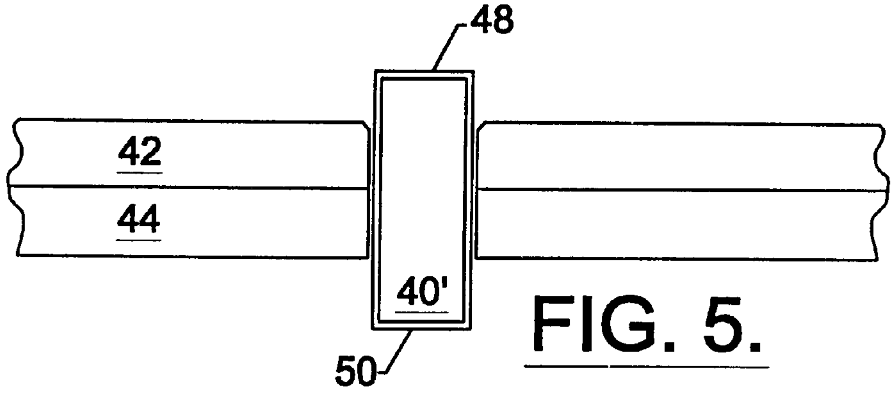
FIG. 5 is a schematic sectional view of a slug rivet fastener used to join two pieces, prior to upsetting.
Figure 6:
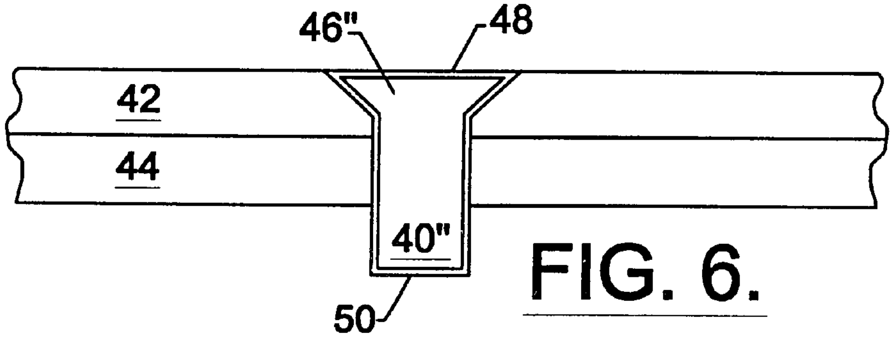
FIG. 6 is a schematic sectional view of a flush-head rivet fastener used to join two pieces, prior to upsetting.

A rivet 40 is provided, numeral 20. The present invention is used with a rivet fastener, or other article manufactured to its conventional shape and size. FIGS. 4–6 illustrate three types of rivets 40, at an intermediate stage of their installation to join a first piece 42 to a second piece 44, after installation to the first and second pieces but before upsetting. The rivet 40 of FIG. 4 has a premanufactured protruding head 46 on one end. The rivet 40' of FIG. 5, a slug rivet, has no preformed head on either end. The rivet 40" of FIG. 6 has a premanufactured flush head 46" on one end, that resides in a countersink in the piece 42. The present invention may be used with these and other types of rivets.

The rivet 40 is manufactured of an aluminum-base alloy. As used herein, “aluminum-alloy” or “aluminum-base” means that the alloy has more than 50 percent by weight aluminum but less than 100 percent by weight of aluminum. Typically, the aluminum-base alloy has about 85–98 percent by weight of aluminum, with the balance being alloying elements and a minor amount of impurity. Alloying elements are added in precisely controlled amounts to modify the properties of the aluminum alloy as desired. Alloying elements that are added to aluminum in combination to modify its properties include, for example, magnesium, copper, and zinc, as well as other elements.

In one case of interest, the aluminum alloy is heat-treatable. The article is first fabricated to a desired shape, in this case a fastener such as a rivet. The alloying elements are selected such that the fabricated shape may be processed to have a relatively soft state, preferably by heating it to elevated temperature for a period of time and thereafter quenching it to lower temperature, a process termed solution treating/annealing. In the solution treating/annealing process, solute elements are dissolved into the alloy matrix (i.e., solution treating) and retained in solution by the rapid quenching, and the matrix itself is simultaneously annealed (i.e., annealing).

After the article is solution treated/annealed, it may be further processed to increase its strength several fold to have desired high-strength properties for service. Such further processing, typically by a precipitation-hardening aging process, may be accomplished either by heating to an elevated temperature for a period of time, termed artificial aging, or by holding at room temperature for a longer period of time, termed natural aging. In conventional Aluminum Association terminology, different artificial aging precipitation treatments, some in combination with intermediate deformation, produce the T6, T7, T8, or T9 conditions, and a natural aging precipitation treatment produces the T4 condition. (Aluminum Association terminology for heat treatments, alloy types, and the like are accepted throughout the art, and will be used herein.) Some alloys require artificial aging and other alloys may be aged in either fashion. Rivets are commonly made of both types of materials.

In both types of aging, strengthening occurs as a result of the formation of second-phase particles, typically termed precipitates, in the aluminum-alloy matrix. Collectively, all of the processing steps leading to their strengthening is generally termed "heat-treating", wherein the article is subjected to one or more periods of exposure to an elevated temperature for a duration of time, with heating and cooling rates selected to aid in producing the desired final properties. The temperatures, times, and other parameters required to achieve particular properties are known and are available in reference documents for standard aluminum-base alloys.

A specific artificially aged aluminum-base alloy of most interest for rivet applications is the 7050 alloy, which has a composition of about 2.3 percent by weight copper, 2.2 percent by weight magnesium, 6.2 percent by weight zinc, 0.12 percent by weight zirconium, balance aluminum plus minor impurities. (Other suitable alloys include, but are not limited to, 2000, 4000, 6000, and 7000 series heat-treatable aluminum alloys.) This alloy is available commercially from several aluminum companies, including ALCOA, Reynolds, and Kaiser. After fabrication to the desired shape such as one of those shown in FIGS. 4–6, the 7050 alloy may be fully solution treated/annealed to have an ultimate shear strength of about 34,000–35,000 pounds per square inch (psi). This state is usually obtained following the fastener's fabrication processing including machining, forging, or otherwise forming into the desired shape. This condition is termed the "untreated state" herein, as it precedes the final aging heat-treatment cycle required to optimize the strength and other properties of the material. The article may be subjected to multiple forming operations and periodically re-annealed as needed, prior to the strengthening precipitation heat-treatment process.

After forming (and optionally re-annealing), the 7050 alloy may be heat-treated at a temperature of about 250° F. for 4–6 hours. The temperature is thereafter increased from 250° F. directly to about 355° F. for a period of 8–12 hours, followed by an ambient air cool. This final state of heat-treatment, termed T73 condition, produces a strength of about 41,000–46,000 psi in the 7050 alloy, which is suitable for fastener applications. (this precipitation-treatment aging step is subsequently performed in step 26 of FIG. 1.)

Returning to the discussion of the method of FIG. 1, the untreated fastener is optionally chemically etched, grit blasted or otherwise processed to roughen its surface, and thereafter anodized in chromic acid solution, numeral 30. Chromic acid solution is available commercially or prepared by dissolving chromium trioxide in water. The chromic acid solution is preferably of a concentration of about 4 percent chromate in water, and at a temperature of from about 90° F. to about 100° F. The article to be anodized is made the anode in the mildly agitated chromic acid solution at an applied DC voltage of about 18–22 volts. Anodizing is preferably continued for 30–40 minutes, but shorter times were also found operable. The anodizing operation produces a strongly adherent oxide surface layer about 0.0001–0.0003 inch thick on the aluminum alloy article, which surface layer promotes the adherence of the subsequently applied organic coating. Anodizing can also be used to chemically seal the surface of the aluminum article. In this case, it was found that it is not as desirable to chemically seal the surface in this manner, as the chemical sealing tends to inhibit the strong bonding of the subsequently applied coating to the aluminum alloy article.

Other anodizing media were also tested for various anodizing times. Sulfuric acid, phosphoric acid, boric acid, and chemical etch were operable to varying degrees but not as successful in producing the desired type of oxide surface that results in strong adherence of the subsequently applied coating.

A coating material is provided, numeral 22, preferably in solution so that it may be readily and evenly applied. The usual function of the coating material is to protect the base metal to which it is applied from corrosion, including, for example, conventional electrolytic corrosion, galvanic corrosion, and stress corrosion. The coating material is a formulation that is primarily of an organic composition, but which may contain additives to improve the properties of the final coating. It is desirably initially dissolved in a carrier liquid so that it can be applied to a substrate. After application, the coating material is curable to effect structural changes within the organic component, typically cross linking of organic molecules to improve the adhesion and cohesion of the coating.

Such a curable coating is distinct from a non-curable coating, which has different properties and is not as suitable for the present corrosion protection application. With a non-curable coating such as a lacquer, there is no need to heat the coated article to elevated temperature for curing. The overaging problems associated with the use of curable coating materials, and which necessitated the present invention, simply do not arise.

The anodizing process, preferably in chromic acid, conducted prior to application of the coating serves to promote strong bonding of the organic coating to the aluminum alloy article substrate. The bonding is apparently promoted both by physical locking and chromate activation chemical bonding effects. To achieve the physical locking effect, as previously discussed the anodized surface is not chemically sealed against water intrusion in the anodizing process. The subsequently applied and cured organic coating serves to seal the anodized surface.

A number of curable organic coating materials are available and operable in the present process. A typical and preferred coating material of this type has phenolic resin mixed with one or more plasticizers, other organic components such as polytetrafluoroethylene, and inorganic additives such as aluminum powder and/or strontium chromate. These coating components are preferably dissolved in a suitable solvent present in an amount to produce a desired application consistency. For the coating material just discussed, the solvent is a mixture of ethanol, toluene, and methyl ethyl ketone. A typical sprayable coating solution has about 30 percent by weight ethanol, about 7 percent by weight toluene, and about 45 percent by weight methyl ethyl ketone as the solvent; and about 2 percent by weight strontium chromate, about 2 percent by weight aluminum powder, with the balance being phenolic resin and plasticizer. A small amount of polytetrafluoroethylene may optionally be added. Such a product is available commercially as "Hi-Kote 1" from Hi-Shear Corporation, Torrance, Calif. It has a standard elevated temperature curing treatment of 1 hour at 400° F. ±25° F., as recommended by the manufacturer.

The coating material is applied to the untreated fastener article, numeral 24. Any suitable approach, such as dipping, spraying, or brushing, can be used. In the preferred approach, the solution of coating material dissolved in solvent is sprayed onto the untreated rivets. The solvent is removed from the as-applied coating by drying, either at room temperature or slightly elevated temperature, so that the coated article is dry to the touch. Preferably, evaporation of solvent is accomplished by flash exposure at 200° F. for about two minutes. The coated article is not suitable for service at this point, because the coating is not sufficiently cured and adhered to the aluminum alloy base metal and because the coating is not sufficiently coherent to resist mechanical damage in service.

In the case of the preferred Hi-Kote 1, the as-sprayed coating was analyzed by EDS analysis in a scanning electron microscope. The heavier elements were present in the following amounts by weight: Al, 82.4 percent; Cr, 2.9 percent; Fe, 0.1 percent; Zn, 0.7 percent; and Sr, 13.9 percent. The lighter elements such as carbon, oxygen, and hydrogen were detected in the coating but were not reported because the EDS analysis for such elements is not generally accurate.

The base metal of the rivet article and the applied coating are together heated to a suitable elevated temperature, numeral 26, to achieve two results simultaneously. In this single step, the aluminum alloy is precipitation heat treated by artificial aging to its final desired strength state, and the coating is cured to its final desired bonded state. Preferably, the temperature and time treatment of step 26 is selected to be that required to achieve the desired properties of the aluminum alloy base metal, as provided in the industry-accepted and proven process standards for that particular aluminum-base alloy. This treatment is typically not that specified by the coating manufacturer and may not produce the most optimal cure state for the coating, but it has been determined that the heat-treatment of the metal is less forgiving of slight variations from the optimal treatment than is the curing treatment of the organic coating. That is, the inventor has demonstrated that the curing of the coating can sustain larger variations in time and temperature with acceptable results than can the heat-treatment of the metal. Contrary to expectations and manufacturer's specifications, the coating cured by the non-recommended procedures exhibits satisfactory adhesion to the aluminum-alloy substrate and other properties during service. Thus, the use of the recommended heat-treatment of the metal yields the optimal physical properties of the metal, and extremely good properties of the coating.

In the case of the preferred 7050 aluminum-base alloy and Hi-Kote 1 coating discussed above, the preferred heat-treatment is the T73 precipitation treatment aging process of 7050 alloy of 4–6 hours at 250° F., followed by a ramping up from 250° F. to 355° F. and maintaining the temperature at 355° F. for 8–12 hours, and an ambient air cool to room temperature.

Thus, the precipitation treatment artificial aging procedure 26 involves significantly longer times at temperature and different temperatures than is recommended by the manufacturer for the organic coating. There was initially a concern that the higher temperatures and longer times, beyond those required for the standard curing of the coating, would degrade the coating and its properties during service. This concern proved to be unfounded. The final coating 48, shown schematically in FIGS. 4–7, is strongly adherent to the base metal aluminum alloy and is also strongly internally coherent. (In FIGS. 4–7, the thickness of the coating 48 is exaggerated so that it is visible. In reality, the coating 48 is typically about 0.0003–0.0005 inch thick after treating in step 26.)

Figure 7:
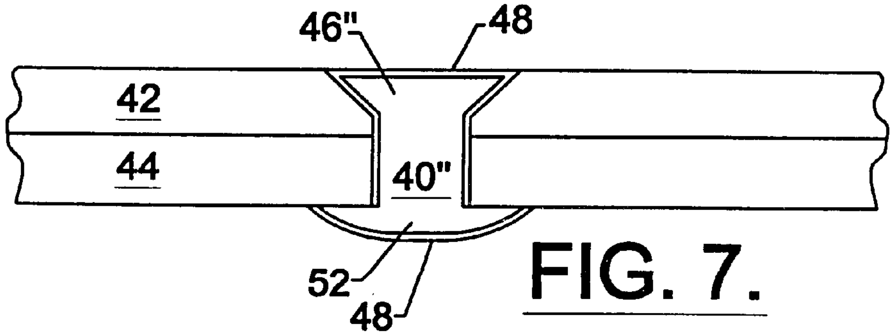
FIG. 7 is a schematic sectional view of the flush-head rivet fastener of FIG. 5, after upsetting.

The coated and treated rivet 40 is ready for installation, numeral 28. The fastener is installed in the manner appropriate to its type. In the case of the rivet 40, the rivet is placed through aligned bores in the two mating pieces 42 and 44 placed into faying contact, as shown in FIG. 4. The protruding remote end 50 of the rivet 40 is upset (plastically deformed) so that the pieces 42 and 44 are mechanically captured between the premanufactured head 46 and a formed head 52 of the rivet. FIG. 7 illustrates the upset rivet 40" for the case of the flush head rivet of FIG. 6, and the general form of the upset rivets of the other types of rivets is similar. The coating 48 is retained on the rivet even after upsetting, as shown in FIG. 7.

The installation step reflects one of the advantages of the present invention. If the coating were not applied to the fastener, it would be necessary to place a viscous wet-sealant material into the bores and onto the faying surfaces as the rivet was upset, to coat the contacting surfaces. The wet-sealant material is potentially toxic to workers, messy and difficult to work with, and necessitates extensive cleanup of tools and the exposed surfaces of the pieces 42 and 44 with caustic chemical solutions after installation of the rivet. Moreover, it has been observed that the presence of residual wet sealant inhibits the adhesion of later-applied paint top coats over the rivet heads. Prior to the present invention, the wet sealant approach was the only viable technique for achieving sufficient corrosion resistance, even thought there had been efforts to replace it for many years. The present coating approach overcomes these problems of wet sealants. Wet sealant is not needed or used during installation. Additionally, the later-applied paint top coats adhere well over the coated rivet heads, an important advantage. The use of wet sealants sometimes makes overpainting of the rivet heads difficult because the paint does not adhere well.

The present invention has been reduced to practice with rivets made of 7050 alloy. The rivets, initially in the untreated state, were coated with Hi-Kote 1 and another, but chromium-free, coating material, Alumazite ZY-138. (Alumazite ZY-138 is a sprayable coating available from Tiodize Co., Huntington Beach, Calif. Its composition includes 2-butanone solvent, organic resin, and aluminum powder.) The coated rivets were precipitation heat-treated to T73 condition with the artificial aging treatment of 4–6 hours at 250° F., followed by a ramping up from 250° F. to 355° F. and maintaining the temperature at 355° F. for 8–12 hours, followed by in ambient air cool to room temperature.

The coated rivets were mechanically tested in accordance with MIL-R-5674 to verify that they meet the required ultimate double shear strength requirements of 41,000–46,000 pounds per square inch achieved by uncoated rivets. In the testing, the ultimate double shear strength was 42,500–43,500 pounds per square inch, within the permitted range. Cylindrical lengths of each type of coated rivet were upset to a diameter 1.6 times their initial diameter to evaluate driveability. No cracking or spalling of the coatings was noticed even on the periphery of the upset region, which is the area that experiences the greatest deformation. Rivets were also installed and subsequently removed to evaluate coating integrity using a scanning electron microscope. The coatings exhibited no signs of cracking, spalling, or any other unacceptable conditions or abnormalities. This latter result is particularly important and surprising. The coatings were retained on the rivets even after the severe deformation resulting from the upsetting process. Thus, the coatings remained in place to protect the rivet against corrosion after installation, obviating any need for the use of wet sealants.

Figure 2A:
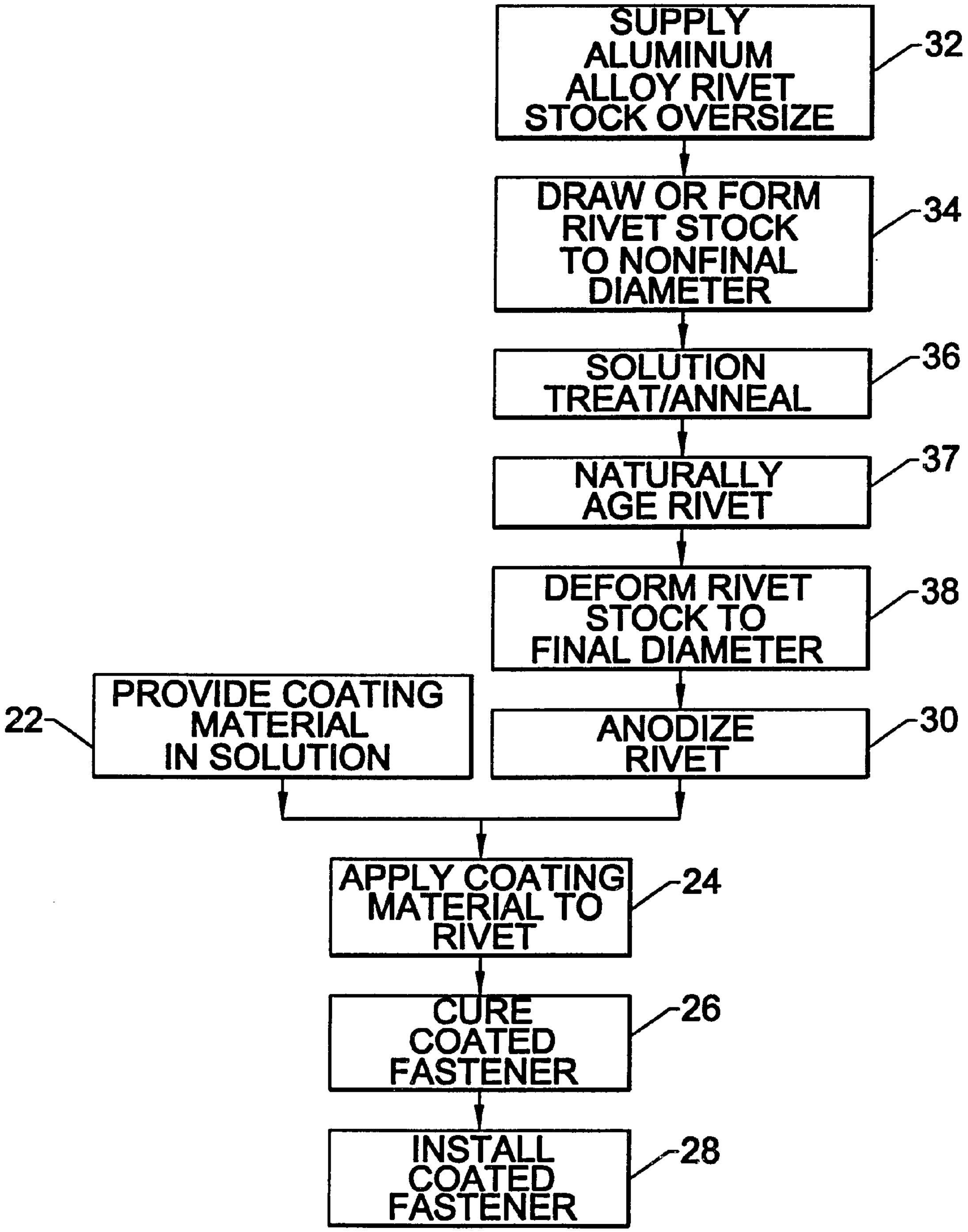
FIG. 2A is a process flow diagram for one form of a second embodiment of the method of the invention.
Figure 2B:
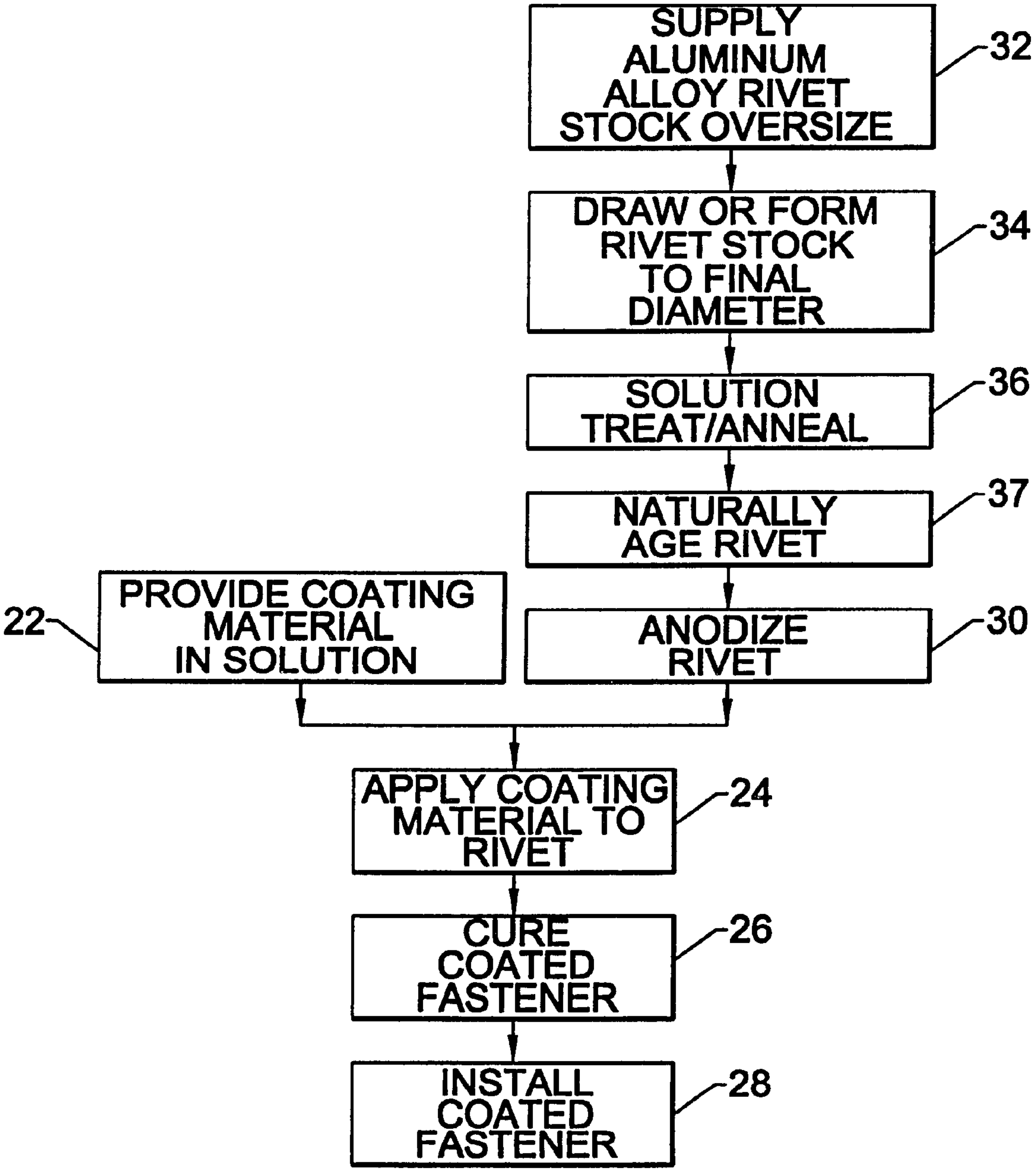
FIG. 2B is a process flow diagram for another form of a second embodiment of the method of the invention.

When aluminum alloys are treated to natural-aging tempers by the approach illustrated in relation to FIG. 1, the aluminum alloy will be overaged due to the heating step 26 required to cure the organic coating. For some fastener applications, overaging of the aluminum alloy is acceptable. In other applications, overaging results in unacceptable properties and must be avoided. FIGS. 2A and 2B depict procedures for obtaining the benefits of a curable organic coating applied to alloys treated to natural-aged tempers.

In one approach, depicted in FIG. 2A, the aluminum alloy rivet stock selected for precipitation heat treating to a naturally aging temper is furnished, numeral 32. The rivet stock is supplied slightly oversize (i.e., larger diameter), as compared with the size furnished for conventional processing in which no curable coating is used. The preferred aluminum alloy for precipitation treatment by natural aging to the T4 condition is 2117 alloy having a nominal composition of 0.4–0.8 percent by weight magnesium, 3.5–4.5 percent by weight copper, 0.4–1.0 percent by weight manganese, 0.10 percent by weight chromium, 0.2–0.8 percent by weight silicon, 0.7 percent by weight iron, 0.25 percent by weight zinc, 0.15 percent by weight titanium, 0.05 percent by weight maximum of other elements, with a total of other elements of no more than 0.15 percent by weight, with the balance aluminum. The 2117 alloy is available commercially from several aluminum companies, including Alcoa, Reynolds, and Kaiser. This alloy may be precipitation hardened by natural aging to the T4 condition at room temperature for at least about 96 hours, developing a shear strength of about 26,000–30,000 psi. (This natural aging heat-treatment step is subsequently performed in step 37 of FIG. 2A and 2B.) The approach is also operable with other alloys that may be aged with a precipitation heat treatment of natural aging, such as, for example, 2017, 2024, and 6061 alloys.

The fastener is deformed to a size different from, and typically larger than, the desired final size, numeral 34, a state termed by the inventor "oversize normal". In the case of a cylindrically symmetric rivet, the rivet stock is preferably drawn to an oversize normal diameter that is typically about 10–15 percent larger than the desired final size. The oversize normal drawn rivet stock is solution treated/annealed according to the procedure recommended for the aluminum alloy, numeral 36. In the case of the preferred 2117 alloy, the solution treatment/aging is accomplished at 890–950° F. for 1 hour, followed by quenching. The rivet stock is naturally aged according to recommendations for the alloy being processed, room temperature for a minimum of about 96 hours in the case of 2117 alloy, numeral 37. The drawn and solution treated/annealed and aged stock is thereafter deformed by cold working, typically drawing, to its final desired diameter, numeral 38, a step termed redrawing or cold working. (However, equivalently for the present purposes the step 34 may be used to deform the rivet stock to a smaller size than the desired final size, and the step 38 may be used to deform the rivet stock to the larger final size, as by a cold heading operation.) This cold working imparts a light deformation to the rivet. The cold-worked rivet stock is optionally anodized, preferably in chromic acid solution, and preferably left unsealed, numeral 30, using the approach described earlier. The coating material is provided in solution, numeral 22, and applied to the rivet stock, numeral 24. Steps 30, 22, and 24 are as described hereinabove in relation to FIG. 1, and those descriptions are incorporated here.

The coated fastener stock is cured, numeral 26. The preferred curing is that recommended by the manufacturer, most preferably 1 hour at 400° F. as described previously. However, a modified curing operation may be employed, depending upon the level of cold working performed on the fastener in step 38. The modified curing cycle is 45 minutes at 375° F. and has been demonstrate to produce acceptable results consistent with the requirements for coating material. The curing operation has the effect of tending to overage the aluminum alloy, which normally requires only natural (room temperature) aging to realize its full strength. However, most surprisingly, it has been found that the additional cold working operation of step 38, conducted after the solution treat/anneal of step 36 and the natural aging of step 37, offsets the overaging effect of step 26 and results in a final rivet that is coated and aged to acceptable aluminum-alloy properties, but not overaged.

In a variant of the approach of FIG. 2A for heat treating and coating articles that are to be treated to a natural aging temper, depicted in FIG. 2B, the aluminum alloy rivet stock is supplied in an oversize condition, numeral 32. The rivet stock is drawn or formed to its final size, numeral 34. (This is distinct from step 34 of FIG. 2A wherein the rivet stock is deformed to the oversize normal diameter.) The drawn rivet stock is solution treated/annealed, numeral 36, and naturally aged, numeral 37. No step 38 of drawing to the final diameter is required, as in the procedure of FIG. 2A. The remaining steps 22, 30, 24, 26, and 28 are as described previously in relation to FIG. 2A, which description is incorporated here.

The approach of FIG. 213 has been successfully practiced using 2117 aluminum alloy. Rivet stock was provided in an oversize diameter of about 0.200–0.205 inch, step 32, as compared with a conventional starting diameter of 0.185–0.186 inch. The oversize rivet stock was drawn to a diameter of 0.185–0.186 inch in step 34 and cold headed to a diameter of 0.187–0.188 inch in step 34. The other steps of FIG. 2B were as described previously for the 2117 aluminum alloy. The required strength of T4 temper was achieved, and additionally the rivets were protected by the adherent coating.

In the procedures of FIGS. 2A and 2B, the extra mechanical working that results to the rivet stock in deforming in steps 34 and 38 from the initial oversize diameter of step 32, coupled with the extra heating involved in the curing step 26, results in a final strength and other mechanical properties that meet the required standards and specifications for fasteners of this type. The extra mechanical cold working tends to raise the mechanical properties above the acceptable limits, while the extra heating during curing reduces the mechanical properties back to the acceptable range. Exact balancing of these effects even permits the mechanical properties to be set at the high side or the low side of the range permitted by most standards. The processing modifications yield the important further benefit that the fastener is coated with a cured coating that protects the fastener from corrosion.

Some alloys are not solution treated/annealed and precipitation treated prior to use, but instead are used in a cold-worked state with a minimum level of deformation-induced strength. The required deformed state of such alloys would apparently be incompatible with heating to elevated temperature to cure the coating. However, it has been demonstrated that a processing such as that illustrated in FIG. 3 for a third preferred embodiment of the invention permits the alloy to be used in a strengthened state induced by deformation and also to be coated with a curable coating. A preferred such alloy is 5056-H32, having a nominal composition of 4.5–5.6 percent by weight magnesium, 0.10 percent by weight copper, 0.05–0.20 percent by weight manganese, 0.30 percent by weight silicon, 0.40 percent by weight iron, 0.05–0.20 percent by weight chromium, 0.10 percent by weight zinc, 0.05 percent by weight maximum of any other element with 0.15 percent by weight total of other elements, balance aluminum. The 5056 alloy, when deformed by cold working with about 2–3 percent reduction to reach the H32 state, exhibits 26,000–28,000 psi ultimate shear strength. If, however, the 5056 alloy is thereafter heated for 1 hour at 400° F., the standard curing treatment for the curable coating material, the ultimate shear strength is reduced to about 24,000–26,000 psi, which is at the very low side of the range permitted by the strength specification but which is deemed too low for commercial-scale operations because of processing variations that may result in strengths below the strength specification for some treated articles.

Figure 3:
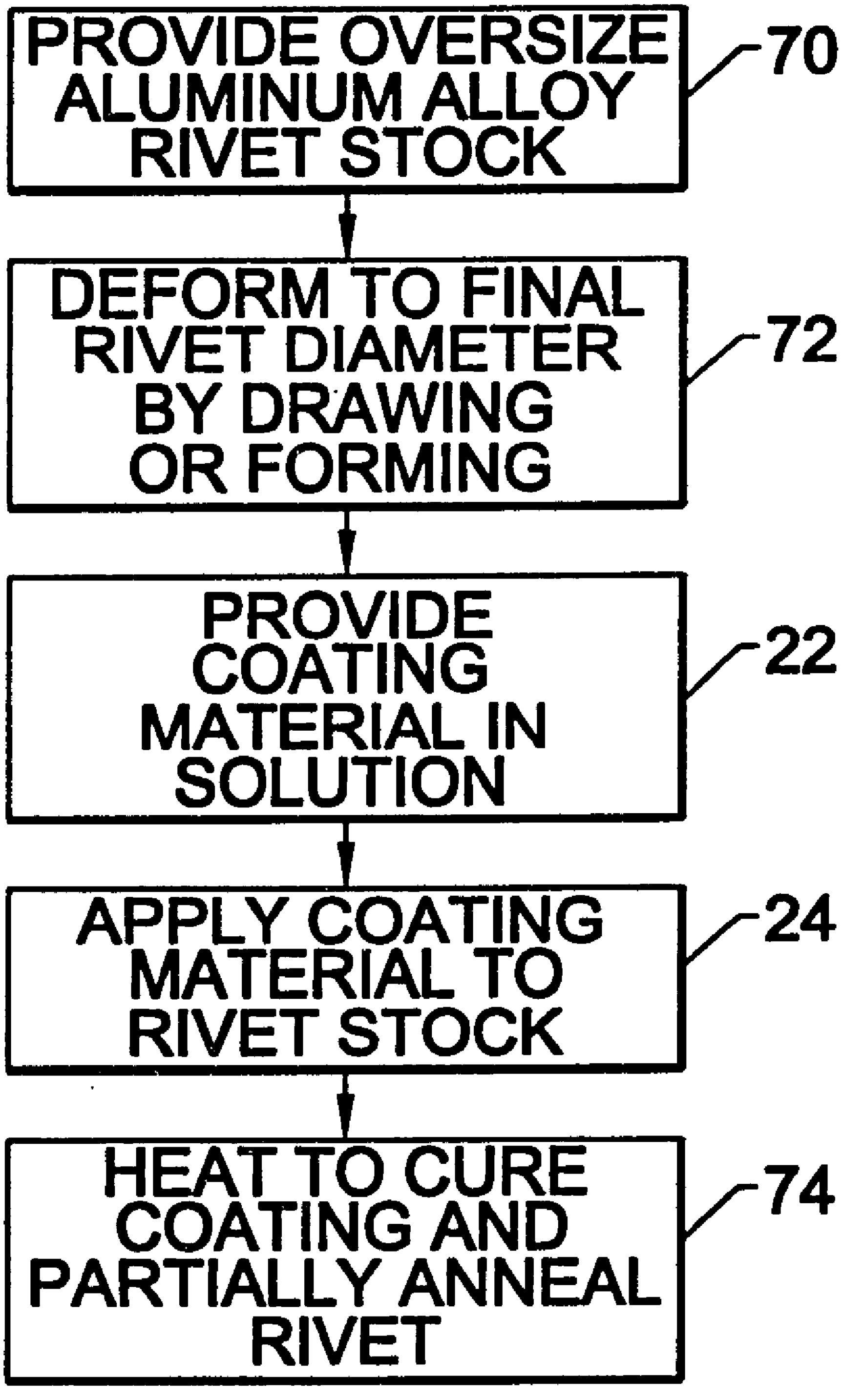
FIG. 3 is a process flow diagram for a second embodiment of the method of the invention.

FIG. 3 illustrates a procedure by which the required mechanical properties are achieved while also having the advantages of a cured coating, for the preferred case of the rivet fastener. The 5056 aluminum material is provided in an initial oversize condition, numeral 70. For example, conventionally a rivet having a final diameter of 0.187–0.188 inch is drawn from stock initially having a diameter of about 0.190–0.191 inch. In the preferred embodiment of the method of FIG. 3, the precursor stock material is initially about 4–5 percent oversize (e.g., a diameter of 0.195 inch for the case of a rivet of final diameter about 0.187–0.188 inch). The oversize stock is deformed, preferably by cold working, to the required final diameter, numeral 72. This rivet precursor, because it has been cold deformed from a size larger than that required to achieve H32 condition, has a strength greater than that required in the H32 condition. The coating material is provided, numeral 22, and applied to the as-deformed rivet precursor material, numeral 24. Optionally, the rivet precursor material may be treated to roughen its surface and preferably anodized in chromic acid (but preferably not chemically sealed) prior to application of the coating material, as previously described.

The coated rivet precursor material is heated to accomplish the standard curing cycle of 1 hour at 400° F. or the modified curing cycle of 45 minutes at 375° F., numeral 74. The curing cycle has two effects. First, the coating is cured so that it is coherent and adherent to the aluminum rivet. Second, the aluminum material is partially annealed to soften it. The partial softening treatment reduces the state of cold-worked deformation in the rivet from that achieved in the overworking operation (step 72) to that normally achieved by the H32 treatment. The rivet may therefore be installed by the procedures already known for the 5056–1132 rivet. The rivet differs from conventional 5056-H32 rivets in that it has the coating cured thereon.

The approach of FIG. 3 has been practiced using the materials and sizes discussed previously. The initially oversize aluminum stock provided in step 70 has an ultimate shear strength of 25,000–26,000 psi. After drawing in step 72, the stock has an ultimate shear strength of 27,000–28,000 psi. After heating in step 74, the final rivet has an ultimate shear strength of 26,000–27,000 psi, which is comfortably within the range required by the H32 mechanical property specification. By comparison, if the aluminum stock is initially not oversize, but has the conventional starting diameter, the final rivet subjected to the remaining steps 72, 22, 24, and 74 has an ultimate shear strength of 24,000–26,000 psi, at the very low end of that required by the H32 specification and which, as discussed earlier, is too low for commercial operations.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article prepared by a method comprising the steps of:

providing an article precursor stock made of an aluminum alloy, the article precursor stock being initially oversize as compared with the final required size of the article;

solution treating and annealing the article precursor;

deforming the article precursor;

aging the article at room temperature;

providing a curable, cross-linkable, phenolic resin-containing organic coating material in an organic solvent, the coating material having a non-volatile portion that is predominantly organic and is curable at about a heat-treatment temperature of the aluminum-alloy article precursor;

applying the organic coating material to the aluminum-alloy article precursor; and heat-treating the coated aluminum article precursor to an ultimate shear strength of at least about 24,000 psi, at a temperature and for a time sufficient to cure simultaneously the organic coating.

2. An article prepared by a method comprising the steps of:

providing a cylindrical rod of aluminum alloy of a naturally aging composition, the rod having a diameter larger than an intended diameter of a rivet;

solution treating and annealing the cylindrical rod;

deforming the rod to the intended diameter;

aging the rod at room temperature;

providing a curable, cross-linkable phenolic resin-containing organic coating material in an organic solvent, the coating material having a non-volatile portion that is predominantly organic and is curable at about a heat-treatment temperature of the aluminum-alloy article precursor;

applying the organic coating material to the rod produced in the step of aging; and heat-treating the coated aluminum rod to an ultimate shear strength of at least about 24,000 psi, at a temperature and for a time sufficient to cure simultaneously the organic coating, forming the article.

3. An article prepared by a method comprising the steps of:

providing an aluminum-alloy article precursor;

deforming the article precursor to a precursor deformation state greater than the deformation state of a final article;

providing a curable, cross-linkable phenolic resin-containing organic coating material in an organic solvent, the coating material having a non-volatile portion that is predominantly organic and is curable at a curing temperature;

applying the organic coating material to the deformed article precursor; and heat-treating the coated aluminum article precursor to its final state to an ultimate tensile strength of at least about 24,000 psi at the curing temperature and for a time sufficient to cure simultaneously the organic coating and partially anneal the article precursor to a required final deformation state, thereby forming the article, the method including no step of solution treating/annealing.

4. The article according to claim 1, wherein the heat-treating temperature is from about 250° F. to about 425° F.

5. The article according to claim 2, wherein the heat-treating temperature is from about 250° F. to about 425° F.

6. The article according to claim 3, wherein the heat-treating temperature is from about 250° F. to about 425° F.

* * * * *